United States Patent
Dochow et al.

(10) Patent No.: US 12,347,444 B2
(45) Date of Patent: Jul. 1, 2025

(54) METHOD FOR OPERATING A FUNCTIONALLY SECURE AUDIO OUTPUT SYSTEM

(71) Applicant: Continental Automotive GmbH, Hannover (DE)

(72) Inventors: Gerhard Dochow, Wetzlar (DE); Joachim Perrevoort, Münster (DE)

(73) Assignee: Continental Automotive Technologies GmbH, Hannover (DE)

(*) Notice: Subject to any disclaimer, the term of this patent is extended or adjusted under 35 U.S.C. 154(b) by 499 days.

(21) Appl. No.: 17/642,447

(22) PCT Filed: Sep. 10, 2020

(86) PCT No.: PCT/EP2020/075377
§ 371 (c)(1),
(2) Date: Mar. 11, 2022

(87) PCT Pub. No.: WO2021/048300
PCT Pub. Date: Mar. 18, 2021

(65) Prior Publication Data
US 2022/0342961 A1 Oct. 27, 2022

(30) Foreign Application Priority Data
Sep. 11, 2019 (DE) ...................... 10 2019 213 888.8
Sep. 20, 2019 (DE) ...................... 10 2019 214 346.6

(51) Int. Cl.
*G10L 19/018* (2013.01)
*G06F 21/16* (2013.01)
*G06F 21/64* (2013.01)

(52) U.S. Cl.
CPC ............ *G10L 19/018* (2013.01); *G06F 21/16* (2013.01); *G06F 21/64* (2013.01)

(58) Field of Classification Search
None
See application file for complete search history.

(56) References Cited

U.S. PATENT DOCUMENTS 7,363,497 B1* 4/2008 Ferguson ......... G11B 20/10527
704/E19.009
10,012,691 B1 7/2018 Zhou et al.
(Continued)

FOREIGN PATENT DOCUMENTS

CN 102237092 A 11/2011
CN 102982806 A 3/2013
(Continued)

OTHER PUBLICATIONS

Zhe Feng et al. "Watermark-based Sensor Data Authentication", Apr. 28, 2019, XP055737767, URL:https://deepblue.lib.umich.edu/handle/2027.42/148655.
(Continued)

*Primary Examiner* — Antim G Shah
(74) *Attorney, Agent, or Firm* — Buchanan Ingersoll & Rooney PC (57) ABSTRACT

A method for operating a functionally safe audio output system with a computing node with a simple certification and a complex computing node, the method comprising generating a code assigned to a warning in the computing node with a simple certification, transmitting the code to the complex computing node, generating, in a first computing process, an output signal having an acoustic watermark, transmitting the output signal to a second computing process independent of the first computing process, determining, in the second computing process independent of the first computing process, a code contained in the output signal, transmitting the code to the computing node with a simple certification, and verifying whether the audio output system
(Continued)

is functionally safe on the basis of a comparison of the generated code with a code based on the received code.

14 Claims, 3 Drawing Sheets

(56) References Cited

U.S. PATENT DOCUMENTS

| | | |
|---|---|---|
| 2010/0223062 A1 | 9/2010 | Srinivasan et al. |
| 2017/0293464 A1 | 10/2017 | Braun et al. |
| 2019/0051060 A1 | 2/2019 | Rapeta et al. |
| 2019/0139399 A1 | 5/2019 | Chellappan et al. |
| 2020/0007342 A1* | 1/2020 | Liem .................. H04L 9/0643 |

FOREIGN PATENT DOCUMENTS

| | | | |
|---|---|---|---|
| CN | 105976823 | A | 9/2016 |
| CN | 108353229 | A | 7/2018 |
| DE | 102014220520 | A1 | 4/2016 |
| WO | 2016115483 | A2 | 7/2016 |

OTHER PUBLICATIONS

C. Neubauer et al. "Continuous Steganographic Data Transmission Using Uncompressed Audio", 1998, Fraunhofer Institut fur Integriere Schaltungen, Erlangen, Germany.

Laurence Boney et al. "Digital Watermarks for Audio Signals", 1996, Department of Electrical Engineering, University of Minnesota, Minneapolis, MN.

International Search Report and Written Opinion dated Oct. 19, 2020 from corresponding International patent application No. PCT/EP2020/075377.

Office Action and first search issued Sep. 10, 2024 from corresponding Chinese patent application No. 202080057490.2.

Notification of Allowance dated Mar. 21, 2025 from corresponding Chinese patent application No. 202080057490.2.

\* cited by examiner

METHOD FOR OPERATING A FUNCTIONALLY SECURE AUDIO OUTPUT SYSTEM

CROSS REFERENCE TO RELATED APPLICATIONS

This U.S. patent application claims the benefit of PCT patent application No. PCT/EP2020/075377 filed on Sep. 10, 2020, which claims the benefit of German patent application No. 10 2019 213 888.8, filed Sep. 11, 2019, and German patent application No. 10 2019 214 346.6, filed Sep. 20, 2019, the three of which are hereby incorporated by reference.

TECHNICAL FIELD

The disclosure relates to a method for operating a functionally safe audio output system, to a functionally safe audio output system, to a vehicle comprising such an audio output system, and also to a computer program product for carrying out the method, and to a data carrier comprising such a program.

BACKGROUND

Functionally safe audio outputs are affected by systems which themselves are deemed to have sufficient functional safety or which operate with the aid of complex monitoring devices on the basis of digital signal processing. Otherwise, the verification of a correctly output audio signal in terms of contents can be provided only to a very limited extent, e.g. in the form of a simple measurement of the maximum level. In addition, there are diagnosis methods which employ test signals perceptible to humans and, in the case of automobile production, for instance, check the correct installation and the function of the infotainment components in the vehicle.

Complex digital signal processing devices are relatively complex and expensive and are therefore shared with system functions that are not functionally safe. A functional safety verification is therefore very complex because, besides the complex signal processing, it also has to take account of portions that are not functionally safe. A check of all the technical components involved in the acoustic transmission often does not take place since this is not possible without perceptible test signals at the run time of the system.

It would therefore be desirable if a functionally safe audio output system could have recourse not only to complex and expensive devices but also to devices with a simple certification and nevertheless ensures the functional safety without excessively increased complexity, and could also carry out the check of technical components involved in the transmission at the run time of the system.

SUMMARY

According to one aspect, a method for operating a functionally safe audio output system with a computing node with a simple certification and a complex computing node comprises generating a first code assigned to a warning in the computing node with a simple certification, transmitting the first code to the complex computing node, generating, in a first computing process, an output signal having an acoustic watermark, transmitting the output signal to a second computing process independent of the first computing process, determining, in the second computing process independent of the first computing process, a second code contained in the output signal, transmitting the second code to the computing node with a simple certification, and verifying whether the audio output system is functionally safe on the basis of a comparison of the generated first code with a code based on the received second code.

The costs and complexity can be saved and the functional safety of the audio output system, in particular also parts thereof, can be checked in a simple manner.

In one embodiment of the method of transmitting the output signal to the second computing process independent of the first computing process, the method further comprises emitting the output signal by means of a sound transducer, and receiving, by means of a sound sensor, an acoustic signal comprising the output signal output by the sound transducer.

The functional safety of the entire transmission path can be checked in a simple and efficient manner.

In one embodiment of the method, the method further comprises emitting a first control signal from the computing node with a simple certification to the complex computing node in order to activate the inclusion of a first signal in the output signal.

Additional, in particular safety-relevant information can be communicated and activated and the safety and the flexibility of the method can thus be increased.

In one embodiment of the method, the method further comprises at least one of superposing the generated first code with a code known to the computing node with a simple certification and which is characteristic of the first signal, generating the output signal from the acoustic watermark and at least one from the first signal or a second signal, and emitting a second control signal from the computing node with a simple certification to the complex computing node in order to activate a limiting stage, which can limit a signal level of a second signal.

Additional, in particular safety-relevant functions can be communicated and activated and the safety and the flexibility of the method can thus be increased.

In one embodiment of the method, the method further comprises emitting a third control signal from the complex computing node to the computing node with a simple certification in order to notify the inclusion of a second signal in the output signal.

Furthermore, non-safety-relevant signals can be used and the checking can be made simpler and more flexible.

In one embodiment of the method, the method repeats the steps of determining, in a second computing process independent of the first computing process, a code contained in the acoustic signal, and transmitting the code to the computing node with a simple certification.

The code can be present multiple times in the output signal, and the code based on the received code can be generated by means of a statistical processing of the codes that are repeatedly determined and transmitted to the computing node with a simple certification.

The evaluation, checking and security of the transmission are particularly secure and robust to withstand interference influences.

In one embodiment of the method, the method according to the invention can be characterized in that the comparison of the generated code with the code based on the received code yields a probability for a positive verification. In this case, this states that the audio output system is thus functionally safe with a certain probability. In this case, at least one threshold value can be provided which, when exceeded, means that a positive verification of the functional safety is established and which, when undershot, means that a negative or no verification of the functional safety is established. Alternatively or additionally, the comparison of the generated code with the code based on the received code can yield a probability for a negative verification, that is to say that the audio output system is functionally unsafe with a certain probability. In this case, at least one threshold value can also be provided which, when undershot, means that a negative verification of the functional safety is established and which, when exceeded, means that a positive or no verification of the functional safety is established.

The safety can be set flexibly in line with requirements.

In the case of a negative verification and/or in the case of no verification, which thus states that the audio output system is functionally unsafe, a method according to the invention carries out at least one of actuating a simpler but reliable alternative audio output, switching the system into a safe state, informing the driver about the presence of a system fault, instigating a check on the basis of redundant properties of the audio output system, and instigating a compensation on the basis of redundant properties of the audio output system.

It is possible to react to a failure of functional safety flexibly and in line with requirements and the driver can be informed about safety-relevant circumstances at any time.

In one embodiment of the method, the method further comprises a sound transducer, and a sound sensor.

The audio output system can be produced simply and more cost-effectively. Moreover, the method are applied to the audio output system.

In one embodiment of the method, the first computing process and the second computing process independent of the first computing process are carried out on the same physical computing node, and the first computing process and the second computing process are separated from one another by means of at least one memory isolation technique.

The safety e.g. vis-à-vis possible programming errors is increased and the proportion of complex components can be reduced.

In one embodiment of the method, the encoding of the acoustic warning signal S with the watermark W is already affected in advance in a certified environment, such that the watermark is from the outset part of the audio data stored in the audio output system or vehicle. The computing operations of the audio output system can be simplified as a result. Each warning is thus also assigned a fixed code or a code pair. This assignment can be stored in a separate database. Consequently, the computing node that is able to acquire simple certification can also transmit just a representative of the warning, and not necessarily the code, to the complex node.

As a result, errors that occur as a result of the knowledge of the code in the complex node can be prevented and the required data processing is reduced and simplified. In this case, the complex node has no information at all about the code.

According to another aspect, a method for operating a functionally safe audio output system with a computing node with a simple certification and a complex computing node comprises reading in a representative assigned to a warning and a first code from a database in the computing node with a simple certification, transmitting the representative to the complex computing node, generating, in a first computing process, an output signal having an acoustic watermark, transmitting the output signal to a second computing process independent of the first computing process, determining, in the second computing process independent of the first computing process, a second code contained in the output signal, transmitting the second code to the computing node with a simple certification, and verifying whether the audio output system is functionally safe on the basis of a comparison of the first code read in with a code based on the received second code.

In one embodiment of the method, the method is performed in a vehicle.

The vehicle can thereby be produced more cost-effectively and functional safety is maintained. Moreover, the method according to the disclosure and of the audio output system according to the disclosure also apply to the vehicle according to the disclosure.

In one embodiment of the method, the method further comprises executing instructions of a computer program by an embedded system.

The method can be flexibly adapted and carried out on many different systems.

In one embodiment of the method, the computer program is stored on a data carrier.

The computer program can easily be transported, saved and duplicated.

In one embodiment of the method, the method checks the entire acoustic transmission path as far as the driver including the loudspeakers. For this purpose, it does not require test signals perceptible to humans. The methods for recognizing acoustic watermarks are very reliable and robust vis-à-vis external disturbances, such that use can take place even in the presence of acoustic disturbances from the interior of the vehicle or the surroundings. The disclosure makes it possible to use non-certifiable processors, i.e. complex processors, which can also fulfil many other tasks besides audio output. In particular, this can be effected in systems which have to bring further audio signal to the driver's attention for listening in addition to a safety-relevant audio signal S. The division into a simple portion according to ASIL which is certifiable as sufficiently reliable and on which complex or fast signal processing in time with the audio samples is not necessary. This enables a cost-effective realization with processors that are currently commercially available. The disclosure also makes it possible to use the typical devices of a driver information system that are present for entertainment, information and voice control on the part of the driver for safety-relevant, acoustic warnings or notifications without the reliability thereof having to be verified in terms of safety for higher ASIL (Automotive Safety Integrity Level) levels greater than QM (Quality Management), since the entire acoustic transmission path is monitored by relatively simple and inexpensive components. In many cases, failures of individual components can be recognized in a timely manner before a safety-critical situation for the driver, said components being able to be exchanged, or they can be tolerated given available redundancy for the case of a safety-critical acoustic warning.

Besides use in a vehicle, use for safety-relevant announcements in public buildings and transport systems, industrial installations, or the like, would also be possible.

The concept according to the disclosure for a functionally safe audio output could be certifiable for example to ASIL B.

BRIEF DESCRIPTION OF THE DRAWINGS

The present disclosure will become more fully understood from the following detailed description with reference to the accompanying figures, wherein.

DETAILED DESCRIPTION

Figure 1:
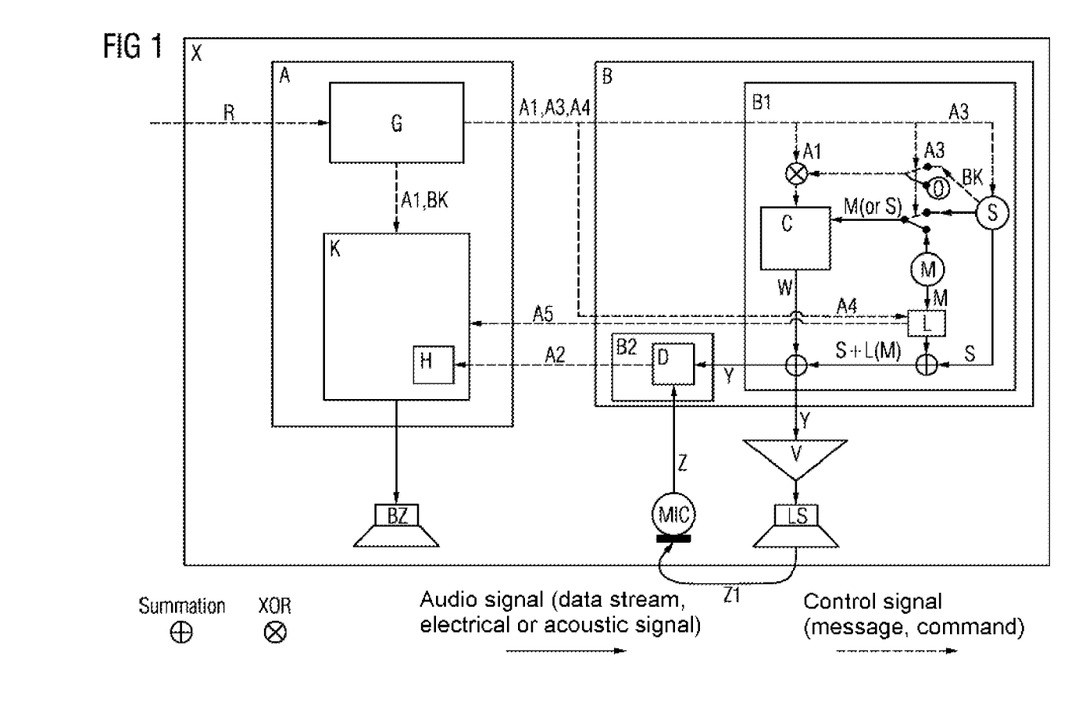
FIG. 1 shows an illustration for operating a functionally safe audio output system.

FIG. 1 schematically illustrates a safe audio output system X according to the disclosure. The functionally safe audio output system X is divided in such a way that an equipped computing node A that is able to acquire relatively simple certification (i.e. for example with low complexity and limited computing power), in particular is certifiable according to ASIL, in a sequence controller (program) G, assigns a code A1 to a specific warning R and transmits it to a more complex node B and the latter, with the aid of a digital signal processing C in a computing process B1, generates a signal W from said code A1 and an acoustic warning signal S to be output, said signal W being masked by the warning signal S to be output, that is to say that a human cannot differentiate the signal S that is output from the superposition of S and W. For this purpose, the sequence controller G transmits a control signal A3 to the computing process B1, which activates the output of the signal S and switches over to the warning signal S as reference signal for the signal processing C. For a reliable and unambiguous differentiation of the signal source for warning sounds S from any other audio signals M, besides the code A1 a characteristic code BK— known to the node A— not equal to zero of the signal source S (e.g. a checksum of the associated audio file) can be superposed on the code A1 e.g. by means of a bit-by-bit exclusive-Or function (XOR). For other audio signals M, it is possible for A1 to remain unchanged, e.g. by a zero being ORed with A1. The signal W is also referred to as an acoustic watermark. The modulation and encoding of A1 to form the acoustic watermark W are typically effected in the signal components of the warning signal S that are redundant and irrelevant for human hearing.

The signal S and W and optionally further signals M (e.g. music) are added to form an output signal Y. In the case where a warning signal S has to be output, the sequence controller G transmits a signal A4 to the computing process B1, which signal activates a limiting stage L and limits the signal level of M to such an extent that the warning S cannot fail to be heard by the driver and the recognition of the watermark in the output signal Y is not disturbed or delayed too much. The computing process B1 typically outputs the output signal Y to an amplifier V, which outputs the amplified signal as an output signal to sound transducers LS (e.g. loudspeakers). The sound generated by the sound transducers LS and possible other noises, the acoustic signal Z1, is picked up both by the driver and by a sound sensor MIC. The latter converts the signal into a signal stream (of samples) Z and feeds the latter to a second computing process B2. Said second computing process is situated in the same physical computing node B, thereby enabling a cost saving, but could also be accommodated in a dedicated computing node. With the aid of a signal processing D, said computing process B2 determines the (most likely) code A2 contained in the signal. The computing process B2 must operate totally independently of the computing process B1 and in particular does not know the code A1 a priori. The most likely code A2 contained from the signal stream Z is transmitted by way of many repetitions to the computing node A, which evaluates the determined codes in a statistical processing H. The sequence controller K in the computing node A in turn, after sufficient code repetitions, can then decide with sufficient reliability whether, in the received acoustic signal Z1, the code A1 BK (A1 xor BK) present in the acoustic signal from the loudspeakers is present in the case of a warning sound output by means of a comparison with the code A2 averaged over many periods and there is thus audibility of the warning signal for the driver. In the case where the averaged code A2 does not correspond to A1 BK, a fault is present in the system and the computing node A can either actuate a simpler but reliable alternative audio output BZ or switch the system into a safe state, in the sense that the presence of a system fault is safely signaled to the driver. For sufficient reliability of the overall system, it must be ensured that the code A1 is not known to the computing process. This can be done by means of memory isolation techniques (e.g. with the aid of memory management units and an operating system that supports process isolation). In order to increase the reliability of the system and to enhance the robustness vis-à-vis interference signals, the code to be encoded can be repeated many times in the signal profile and can be evaluated by means of a stochastic processing H in the computing node A before a decision is taken about the presence of a system fault in the sequence controller K of the computing node A. In particular, correlation filters are suitable for this purpose; for example, a signal-matched filter (matched filter) can also be used.

During signal output and the appraisal of whether the output signal has reached the person to be informed, various factors can be taken into account. In particular, the ambient loudness, but also other information, specifically personal information, personal settings and listening habits, can be taken into account. In this regard, for example, seat settings, body positioning, typical loudness settings and information in particular about limitations or oversensitivity in the area of a person's hearing ability can be taken into account. The presence or use of external devices, in particular of hearing aids, and the settings thereof can also be taken into account. This is realized by means of communication between the external devices and a vehicle component, but can also be ascertained indirectly by means of vehicle sensors. In this regard, for example, a camera can ascertain the absence of a hearing aid and/or the playback of sounds and other noises takes place with an increased loudness.

Functioning of the transceiver system can also be checked in the background without the presence of a warning if a sufficiently loud signal M is present. The fact of whether the audio signal M is sufficiently loud can be determined by the limiting stage L since the latter measures the present power of the signal, and this can be communicated to the sequence controller K as a control signal A5. The audio signal M is fed to the signal processing C instead of the warning S and is processed just like S. If the control signal A5 signals a sufficient audio loudness, the sequence controller K can decide on the basis of the received code A2 whether a system fault is present. In general, in this case there is no need to take a decision within a short time because no endangerment is present, for which reason the times for the statistical evaluation are permitted to be chosen to be correspondingly longer and the reliability for a correct decision as to whether or not a system fault is present thus increases. The sequence controller K can use the result of the checking in the background to immediately inform the driver of the presence of a system fault by means of some other functional method (e.g. by way of a visual output or alternative acoustic output) and for example can request that recourse be had to the service facilities. Since, in general, nowadays the audio output is effected via a plurality of sound transducers (loudspeakers) and often sound is also picked up via a plurality of microphones MIC in order to improve the directional effect, a redundant acoustic system is often present, which fails only in the unlikely case of a simultaneous failure of all the sound transducers or microphones, which can be taken into account by the signal processing D and the sequence controller K. For example, the failure of one or more microphones can easily be recognized as long as a signal stream Z with a correctly recognized code is still present from at least one microphone. It is likewise possible to test the loudspeakers individually, by the code A1 being superposed alternately on only one loudspeaker channel or by different codes (which are statistically independent of one another) being superposed on each loudspeaker. In these cases, the driver can be advised of a service situation before a system failure occurs.

However, an apparent system failure may then be recognized erroneously if an external acoustic interference signal is so loud that all of the microphones fail because they are driven to their limit, for example. However, an overdriven acoustic signal Z1 can be recognized by the signal processing D and be differentiated from a typical signal profile of a failed microphone, since the latter does not supply an audio signal level or supplies only a low level. In the case of overdriving, the signal processing D then sends a special code A2 to the sequence controller K, which can cause a warning to be output to the driver by means of some other method, e.g. by means of a visual output, since the acoustic transmission route to the driver is no longer ensured.

Furthermore, there is the possibility that an error occurs during the generation, processing and/or transmission of signals, and therefore the probability that the code A1 and the code A2 correspond is substantially always 1. This may occur for example owing to the fact that the computing process B1 is not correctly separated from the computing process B2 and therefore the code A1 is known to the computing process B2 or is used incorrectly by the latter. Such an error could be discovered by means of an alteration or erasure of the code A1 or of the code A1 BK after use in the computing process B1 in or from the complete memory.

Alternatively or additionally, in particular in the case where the transmission path from the amplifier V via the sound transducer LS to the person's ear can be classified as functionally safe or be verified in some other way, the output signal Y can also be fed directly to the computing process B2. By means of the verified transmission path, the complete processing path including the acoustic transmission can thus be classified as functionally safe. In particular, the code actually contained in the acoustic signal therefore also passes to the computing process B2 substantially just like by means of a purely electronic transmission.

Figure 2:
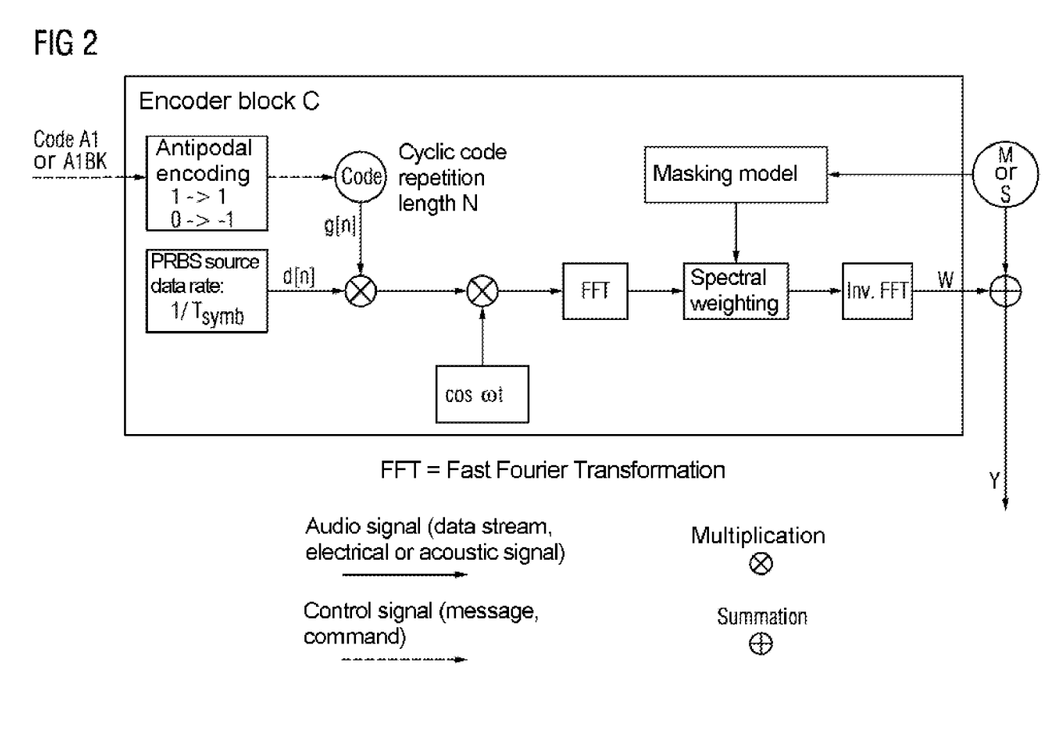
FIG. 2 shows an illustration of a digital signal processing.

An exemplary realization of the digital signal processing C (encoder) is illustrated and described in FIG. 2. The code to be encoded can be spread by means of binary phase shift keying (BPSK) to a large frequency range, which can be realized in the case of antipodal signal encoding (e.g. −1; 1) from a known, pseudo-random signal sequence (PRBS source) and a cyclically repeated code sequence by means of a simple multiplication of the signals. A superposition of the code to be encoded with such a known, pseudo-random signal sequence from the PRBS source with an approximately white spectrum and an unambiguous peak in its autocorrelation function (e.g. with an XOR function) simplifies the recognition of the beginning and of the period of the pulse sequence since the autocorrelation function has an unambiguous maximum after exactly one period. Finally, the signal can be multiplied by a cosine function in order to attain a spectral shift of the maximum spectral contribution to a suitable value. Furthermore, it is possible to effect the weighting of the resulting signal sequence in the frequency domain (e.g. by means of a fast Fourier transformation FFT) by way of a psychoacoustic model of humans such that the signal W remains below the perception threshold of human hearing. In this case, the masking model supplies the weighting process with an estimation regarding the masking threshold, such that the audio signal M and/or the warning S only just mask(s) the alteration as a result of the code. Moreover, it is possible to modify the code to be encoded such that transmission errors can be recognized by the receiver, e.g. with the aid of convolutional codes.

If a plurality of safety-relevant sounds have to be output simultaneously, it is possible to use PNR signals with orthogonal codes for different sounds and for the purpose of better and reliable differentiability with different code period lengths.

Figure 3:
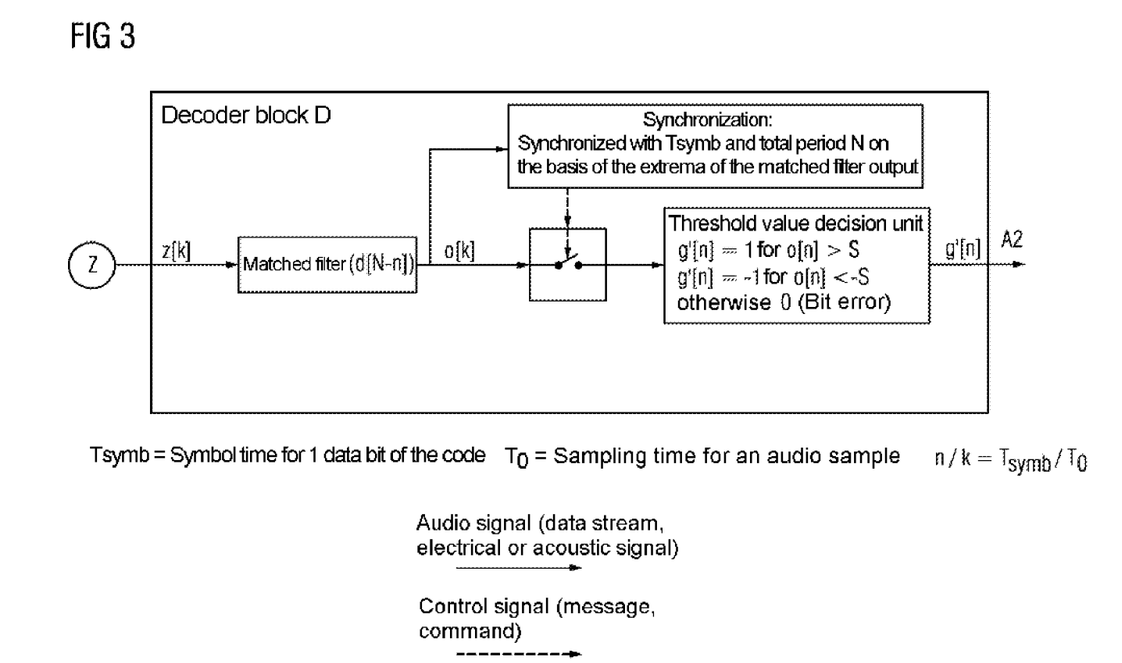
FIG. 3 shows a further illustration of a digital signal processing.

An exemplary implementation of the signal processing D (decoder) is illustrated and described in FIG. 3 and has a matched filter, to which the sampling data stream z[k], the signal stream Z coming from the microphone, is fed. The matched filter has a temporally inverted impulse response d[N−n] with respect to the PRBS signal, having a maximum correlation or anticorrelation with the input signal in each case at the limits of the symbol durations Tsymb=n*T0. These extrema are recognized by a synchronization unit and actuate a sampling unit, which samples the output of the matched filter o[k] at the points in time n and feeds that to a threshold value decision unit. The latter decides whether a sufficient correlation for a positive data bit (data bit g[n] and PRBS sequence d[n] are identical) or a sufficient anticorrelation (data bit g[n] and PRBS sequence d[n] are different) for a negative bit is present on the basis of a threshold S to be chosen empirically. If this is not the case, the decision unit outputs a 0, indicating an unrecognized bit or a bit error. The code A2 representing an estimation of the code A1 BK thus arises at the output of the decoder D. Since this code A2 may still have bit errors or even estimation errors, it is transmitted to a stochastic evaluation unit H in the computing node A over many periods N of the code sequence A1. Said evaluation unit can then carry out the stochastic evaluation very simply by adding the data bits at identical bit positions of the received code words A2 and can feed the result to a threshold value decision unit in the sequence controller K.

In an alternative embodiment, the encoding of the acoustic warning signal S with the watermark W can also already be effected in advance in a certified environment, such that the watermark is from the outset part of the audio data stored in the audio output system X or vehicle. The computing operations of the audio output system X can be simplified as a result. Each warning R is thus also assigned a fixed code A1 or a code pair A1, BK. This assignment can be stored in a separate database. Consequently, the computing node A that is able to acquire simple certification can also transmit just a representative of the warning R, and not necessarily the code A1, to the complex node B. As a result, errors that occur as a result of the knowledge of the code A1 in the complex node B can be prevented. In this case, the complex node B has no information about the code A1 at all.

Accordingly, firstly a representative assigned to a warning R and a code A1 from a database are read in by the computing node A with a simple certification. The representative is transmitted to the complex computing node B in order there to ascertain the audio signal which is assigned to the warning and which comprises at least the code A1 as a watermark. The computing node B is not permitted to have access to the database comprising the codes A1 and the representatives. In this case, the audio signal was created in advance in a certified environment and stored on the audio output system during or after the production thereof. In this case, the certified environment is suitable for creating audio output data for safety-critical applications in the automotive field, such that a high ASIL level, i.e. higher than QM level, can thus be achieved. In a first computing process B1, an output signal Y comprising the audio signal with the code A1 is then generated. The output signal is then transmitted to a second computing process B2 independent of the first computing process B1. In said second computing process, a code A2 contained in the output signal Y is then extracted. This extracted or received code A2 is then transmitted to the computing node A with a simple certification. In the latter, the code A1 read in is then compared with a code based on the received code A2 in order to verify whether the audio output system is functionally safe.

If the transmission of the output signal Y to the second computing process B2 independent of the first computing process B1 takes place via the loudspeaker-microphone path it is thus possible to verify whether the audio output system is functionally safe.

The audio signals already comprising the watermark, and the associated representatives and codes A1 can also be made available to the audio output system subsequently by way of software updates, in particular updates made available by way of remote maintenance, so-called over-the-air updates.

In this case, such a functionally safe audio output system X comprises at least one sound transducer LS, a sound sensor MIC, a computing node A with a simple certification, a database and a complex computing node B.

In vehicles, in particular the sound transducer and the sound sensor can also be configured in the form of trim components. Furthermore, the spatially targeted emission of sound waves can also be carried out by means of a laser.

Although the disclosure has been more specifically illustrated and described in detail by embodiments, the disclosure is not restricted by the examples disclosed. Variations thereof can be derived by a person skilled in the art without departing from the scope of protection of the disclosure such as is defined by the following patent claims.

The invention claimed is:

1. A method for operating a functionally safe audio output system with a first computing node and a second computing node, the method comprising:
generating a first code assigned to a warning in the first computing node;
transmitting the first code to the second computing node;
generating, in a first computing process, an output signal having an acoustic watermark, wherein the acoustic watermark is a modulation and encoding of the first code;
transmitting the output signal to a second computing process independent of the first computing process;
determining, in the second computing process independent of the first computing process, a second code contained in the output signal;
transmitting the second code to the first computing node; and
verifying whether the audio output system is functionally safe on the basis of a comparison of the generated first code with a code based on the received second code,
wherein the comparison of the generated first code with the code based on the received second code yields a probability for a negative verification, wherein the audio output system is functionally unsafe with a certain probability, and in that at least one threshold value is provided which, when exceeded, means that a positive or no verification of the functional safety is established, and
wherein the negative verification of the functional safety of the audio output system is established, performing at least one of:
actuating an alternative audio output,
switching the system into a safe state,
informing the presence of a system fault,
instigating a check on the basis of redundant properties of the audio output system, and
instigating a compensation on the basis of redundant properties of the audio output system.

2. The method of transmitting the output signal to the second computing process independent of the first computing process according to claim 1, further comprising:
emitting the output signal by means of a sound transducer; and
receiving, by means of a sound sensor, an acoustic signal comprising the output signal output by the sound transducer.

3. The method according to claim 1, further comprising:
emitting a first control signal from the first computing node to the second computing node in order to activate the inclusion of a first signal in the output signal.

4. The method according to claim 3, further comprising at least one of:
superposing the generated first code with a code known to the first computing node and which is characteristic of the first signal;
generating the output signal from the acoustic watermark and at least one from the first signal or a second signal; and
emitting a second control signal from the first computing node to the second computing node in order to activate a limiting stage, which can limit a signal level of a second signal.

5. The method according to claim 1, further comprising:
emitting a third control signal from the second computing node to the first computing node in order to notify the inclusion of a second signal in the output signal.

6. The method according to claim 1, wherein determining in the second computing process independent of the first computing process, the second code contained in the acoustic signal and transmitting the second code to the first computing node are carried out repeatedly, and the code based on the received second code is generated by means of a statistical processing of the second codes that are repeatedly determined and transmitted to the first computing node.

7. The method according to claim 6, wherein the code is at least one of the first code and the code known to the computing node is present multiple times in the output signal.

8. The method according to claim 1, further comprising a sound transducer, and a sound sensor.

9. The method according to claim 8, wherein the first computing process and the second computing process independent of the first computing process are carried out on the second computing node, and wherein the first computing process and the second computing process are separated from one another by means of at least one memory isolation technique.

10. The method according to claim 8, wherein the method is performed in a vehicle.

11. The method according to claim 1, the method further comprising:
executing instructions of a computer program by an embedded system.

12. The method according to claim 11, wherein the computer program is stored on a data carrier.

13. A method for operating a functionally safe audio output system with a first computing node and a second computing node, the method comprising:
reading in a representative assigned to a warning and a first code from a database in the first computing node;
transmitting the representative to the second computing node;
generating, in a first computing process, an output signal having an acoustic watermark, wherein the acoustic watermark is a modulation and encoding of the first code;
transmitting the output signal to a second computing process independent of the first computing process;
determining, in the second computing process independent of the first computing process, a second code contained in the output signal;
transmitting the second code to the first computing node; and
verifying whether the audio output system is functionally safe on the basis of a comparison of the first code read in with a code based on the received second code,
wherein the comparison of the generated first code with the code based on the received second code yields a probability for a negative verification, wherein the audio output system is functionally unsafe with a certain probability, and in that at least one threshold value is provided which, when exceeded, means that a positive or no verification of the functional safety is established, and
wherein the negative verification of the functional safety of the audio output system is established, performing at least one of:
actuating an alternative audio output,
switching the system into a safe state,
informing the presence of a system fault,
instigating a check on the basis of redundant properties of the audio output system, and
instigating a compensation on the basis of redundant properties of the audio output system.

14. The method according to claim 13, further comprising a sound transducer, a sound sensor, and a database.

* * * * *